United States Patent
Kristof et al.

(10) Patent No.: US 11,065,975 B2
(45) Date of Patent: Jul. 20, 2021

(54) METHOD FOR ELECTRICALLY CHARGING AN ENERGY STORE BY SWITCHING BETWEEN TWO CONFIGURATIONS

(71) Applicant: Dr. Ing. h.c. F. Porsche Aktiengesellschaft, Stuttgart (DE)

(72) Inventors: Thomas Kristof, Karlsruhe (DE); Wolf-Georg Rampf, Karlsruhe (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 289 days.

(21) Appl. No.: 16/267,851

(22) Filed: Feb. 5, 2019

(65) Prior Publication Data
US 2019/0263284 A1 Aug. 29, 2019

(30) Foreign Application Priority Data
Feb. 27, 2018 (DE) .......................... 102018104414.3

(51) Int. Cl.
*H02J 7/00* (2006.01)
*B60L 53/62* (2019.01)
*B60L 53/14* (2019.01)

(52) U.S. Cl.
CPC .............. *B60L 53/62* (2019.02); *B60L 53/14* (2019.02); *H02J 7/007* (2013.01); *H02J 7/0024* (2013.01); *B60L 2260/40* (2013.01)

(58) Field of Classification Search
CPC ........ H02J 7/007; H02J 7/0013; H02J 7/0029; H02J 7/0024; H01M 10/44; B60L 53/62; B60L 53/14
USPC ....................................................... 320/162
See application file for complete search history.

(56) References Cited

U.S. PATENT DOCUMENTS

| | | | | | |
|---|---|---|---|---|---|
| 5,977,657 | A | * | 11/1999 | Van Lerberghe | H02J 9/061 307/44 |
| 6,392,383 | B1 | * | 5/2002 | Takimoto | G06F 1/1632 320/115 |
| 6,559,621 | B2 | * | 5/2003 | Corless | H01M 10/44 320/103 |
| 6,700,352 | B1 | * | 3/2004 | Elliott | H02J 7/00043 320/130 |
| 7,573,238 | B2 | * | 8/2009 | Kawai | B60L 58/24 320/132 |

(Continued)

FOREIGN PATENT DOCUMENTS

DE 102009017087 A1 10/2010
DE 102014004790 A1 10/2015
(Continued)

OTHER PUBLICATIONS

Japanese Notification of Reason for Rejection for Japanese Application No. 2019-027500, dated Apr. 14, 2020, 6 pages.

*Primary Examiner* — John T Trischler
(74) *Attorney, Agent, or Firm* — RatnerPrestia

(57) ABSTRACT

A method for electrically charging an energy store. The method includes the following steps: starting an electrical charging process for the energy store in a first configuration; interrupting the charging process, changing the configuration of the energy store from the first configuration to a second configuration, and resuming the charging process in the second configuration. The energy store in the first configuration is designed to be charged with a higher electrical voltage than in the second configuration.

10 Claims, 2 Drawing Sheets

(56) References Cited

U.S. PATENT DOCUMENTS

| | | | |
|---|---|---|---|
| 7,939,190 B2* | 5/2011 | Colello | G01R 31/396 |
| | | | 429/61 |
| 8,525,480 B2 | 9/2013 | Anderson | |
| 8,525,487 B1* | 9/2013 | Stevenson | H02J 2207/20 |
| | | | 320/166 |
| 8,697,267 B2* | 4/2014 | Colello | G01R 31/396 |
| | | | 429/61 |
| 8,963,504 B2 | 2/2015 | Kuroda et al. | |
| 9,325,021 B2 | 4/2016 | Colello et al. | |
| 9,479,050 B1* | 10/2016 | Reddy | H02M 3/07 |
| 9,891,685 B1* | 2/2018 | Marr | G06F 1/30 |
| 9,910,471 B1* | 3/2018 | Marr | G06F 1/26 |
| 10,239,410 B2* | 3/2019 | Kristof | H01M 10/48 |
| 10,421,364 B2* | 9/2019 | Kristof | B60L 53/20 |
| 10,471,837 B2* | 11/2019 | Herke | H02J 7/0027 |
| 2002/0171397 A1 | 11/2002 | Adrian et al. | |
| 2005/0052154 A1* | 3/2005 | Kavounas | H02J 7/345 |
| | | | 320/116 |
| 2005/0084745 A1* | 4/2005 | Colello | H01M 8/04679 |
| | | | 429/61 |
| 2009/0079384 A1* | 3/2009 | Harris | H02J 7/0024 |
| | | | 320/102 |
| 2009/0128158 A1* | 5/2009 | Kawai | B60L 58/24 |
| | | | 324/433 |
| 2010/0188045 A1* | 7/2010 | Colello | G01R 31/396 |
| | | | 320/118 |
| 2011/0313613 A1* | 12/2011 | Kawahara | H01M 10/48 |
| | | | 701/34.4 |
| 2012/0126744 A1* | 5/2012 | Kuroda | H02J 7/042 |
| | | | 320/107 |
| 2012/0133310 A1* | 5/2012 | Lee | B60L 58/21 |
| | | | 318/139 |
| 2012/0161698 A1 | 6/2012 | Anderson | |
| 2013/0106382 A1* | 5/2013 | Marsili | H02M 3/157 |
| | | | 323/283 |
| 2013/0300370 A1* | 11/2013 | Hotta | H01M 10/482 |
| | | | 320/117 |
| 2014/0227563 A1* | 8/2014 | Colello | H01M 8/04679 |
| | | | 429/51 |
| 2016/0001664 A1* | 1/2016 | Roth | B60L 50/66 |
| | | | 318/139 |
| 2016/0036233 A1* | 2/2016 | Yatsu | H02J 3/32 |
| | | | 307/71 |
| 2016/0214493 A1 | 7/2016 | Herke et al. | |
| 2016/0344305 A1* | 11/2016 | Wang | H02M 3/33507 |
| 2017/0113559 A1* | 4/2017 | Kristof | B60L 53/50 |
| 2017/0222454 A1* | 8/2017 | Bakker | H01M 10/46 |
| 2017/0334303 A1* | 11/2017 | Kristof | B60L 53/16 |
| 2017/0368958 A1* | 12/2017 | Eun | B60L 58/20 |
| 2018/0102706 A1* | 4/2018 | Gao | H02M 3/02 |
| 2018/0134167 A1* | 5/2018 | Kristof | B60L 11/1811 |
| 2018/0316198 A1 | 11/2018 | Niizuma | |
| 2018/0354374 A1* | 12/2018 | Lee | B60L 58/20 |
| 2019/0089023 A1* | 3/2019 | Sastry | H01M 10/052 |
| 2019/0126761 A1* | 5/2019 | Verbridge | H01M 2/305 |
| 2019/0229542 A1* | 7/2019 | Dunn | H01M 16/006 |
| 2019/0288528 A1* | 9/2019 | Greetham | H02J 7/0024 |
| 2020/0055412 A1* | 2/2020 | Krieg | H02J 7/0024 |
| 2020/0070667 A1* | 3/2020 | Wang | B60L 50/51 |
| 2020/0185953 A1* | 6/2020 | Shimizu | H02M 3/1584 |
| 2020/0195032 A1* | 6/2020 | Shimizu | H02J 7/0068 |
| 2020/0212686 A1* | 7/2020 | Oukassi | H01M 10/425 |
| 2020/0321649 A1* | 10/2020 | Zhan | H02J 7/0024 |
| 2020/0353828 A1* | 11/2020 | Kristof | B60L 58/20 |

FOREIGN PATENT DOCUMENTS

| | | |
|---|---|---|
| DE | 102016207272 A1 | 11/2017 |
| DE | 102016225513 A1 | 6/2018 |
| DE | 102017206834 A1 | 10/2018 |
| EP | 0174445 A2 | 3/1986 |
| JP | 0530664 A | 2/1993 |
| JP | 2008278635 A | 11/2008 |
| JP | 2017093091 A | 5/2017 |
| RU | 2506603 C2 | 2/2014 |
| RU | 2522425 C2 | 7/2014 |

\* cited by examiner

METHOD FOR ELECTRICALLY CHARGING AN ENERGY STORE BY SWITCHING BETWEEN TWO CONFIGURATIONS

CROSS-REFERENCE TO RELATED APPLICATION

This application claims priority to German Patent Application No. DE 10 2018 104 414.3, filed Feb. 27, 2018, the contents of such application being incorporated by reference herein in their entirety.

FIELD OF THE INVENTION

The present invention relates to a method for electrically charging an energy storage device.

BACKGROUND OF THE INVENTION

Electrically chargeable energy stores are used for example in motor vehicles as an energy source for electric drives. These may be electrochemical stores, for example, which may also be referred to as rechargeable batteries or accumulators. In order to be able to electrically charge these energy stores completely, relatively high voltages of more than 700 V, for example 800 V, are required in some instances. A store may be referred to as a storage element.

However, some devices for charging such energy stores can only provide a maximum voltage which is less than said voltage required for complete charging (e.g. less than 700 V). Consequently, complete charging is not possible without further measures.

DE 10 2009 017 087 A1, U.S. Pat. No. 2,012,161 698 A and U.S. Pat. No. 2,016,214 493 A, all of which are incorporated by reference herein for all purposes and in their entirety, disclose devices comprising a control unit, which adapts a charging current to different conditions.

EP 0 174 445 A2, which is incorporated by reference herein, discloses a method in which the voltage present at the poles of the energy store is monitored. The charging process is interrupted in the event of predefined limit values being exceeded.

SUMMARY OF THE INVENTION

Against this background, described herein is a method by which an energy store can be rapidly charged by a device which cannot provide the voltage required for complete charging in an operating state of the energy store. Moreover, the intention is to provide a device which is suitable for carrying out such a method, and a motor vehicle comprising such a device.

In accordance with the method, firstly the electrical charging process for the energy store is started, the energy store being in a first configuration. The charging process is subsequently interrupted. During the interruption, the configuration of the energy store is changed from the first configuration to a second configuration. The charging process is then resumed, the energy store being in the second configuration.

In the first configuration the energy store is designed to be charged with a higher electrical voltage than in the second configuration. This may mean, in particular, that a voltage required for complete charging of the energy store in the first configuration is higher than that required for complete charging of the energy store in the second configuration. The first configuration is preferably the configuration in which the energy store is used as an energy source, and may also be referred to as the operating state of the energy store.

This method is advantageous since the energy store in the second configuration can be charged completely by a device by which the energy store in the first configuration could not be charged completely.

A further advantage is that the charging process can be carried out relatively rapidly. The device used for the charging process can usually provide only a limited maximum current. This maximum current is independent of the voltage used during the charging process. In the first configuration the charging process can be carried out with a voltage that is as high as possible until the interruption, such that a relatively high power is achieved.

According to one embodiment of the invention, interrupting the charging process can be carried out if a voltage present between two electrical poles of the energy store reaches or exceeds a first voltage threshold value. The first voltage threshold value can be chosen for example depending on the voltage maximally attainable for the charging by the device. In this way, the charging process can be carried out for as long as possible in the first configuration of the energy store, which results in a high power, whereby the charging process requires little time.

According to one embodiment of the invention, the energy store can be charged with electrical energy from an energy source. The energy source can be for example a current generating device (e.g. a power plant or a generator). Before interrupting the charging process, an electrical consumer is switched on. By way of example, if an energy store in a motor vehicle is involved, said electrical consumer can be a heating device of the motor vehicle. The electrical consumer is supplied with electrical energy by the energy source during the interruption of the charging process.

This embodiment is particularly advantageous in order to use the method in conjunction with devices already known. Said devices often do not permit an interruption of the charging process. However, if the electrical consumer is supplied with electrical energy by the energy source during the interruption of the charging process, a state as if the charging process had not been interrupted is manifested for the device. The device continues to emit electrical power as if the charging process was still proceeding. A further advantage is that an interaction of a user is not necessary to interrupt the charging process.

Changing the configuration of the energy store from the first configuration to the second configuration without interrupting the charging process is often detected as load shedding by the device used for charging. This usually results in termination of the charging process.

According to one embodiment of the invention, the charging process is carried out with electric current. The current intensity of the current is reduced if the voltage used for the charging process is greater than a second voltage threshold value. In this case, the reduction can be carried out continuously or in steps.

By way of example, the current intensity can be decreased to a value which is drawn by the consumer that is switched on during the interruption. In this case, the device used for charging does not change anything during the interruption of the charging process. The power provided is drawn by the electrical consumer instead of the energy store. The reduction is preferably effected to a value of between 1 and 10 amperes.

According to one embodiment of the invention, the current intensity can be increased after resuming the charging process. This increase can be carried out in steps or continuously. A higher current intensity contributes to faster charging.

According to one embodiment of the invention, the current intensity can be reduced to a value that is adapted to the electrical consumer. If the electrical consumer is designed for example for consuming a specific electrical power, the current intensity can be reduced to a value which, multiplied by the voltage present at the consumer, results in said power.

According to one embodiment of the invention, the energy store in the second configuration can have two energy store modules electrically connected in parallel with one another. This is understood to mean, in particular, that both energy store modules are charged in parallel with one another and at the same time. On account of the parallel connection, the maximum voltage required therefor is halved by comparison with the first configuration. In other words if a maximum voltage of 800 V would be required in the first configuration, for example, then the maximum voltage in the second configuration is only 400 V.

In the first configuration the energy store modules can be connected in series, for example.

According to one embodiment of the invention, the electrical consumer is switched off after resuming the charging process. This saves energy since the consumer is no longer required to consume current during the interruption.

The device described herein comprises a control unit. The device is designed to carry out a method according to an embodiment of the invention. The control unit may be designed for carrying out the method. The control unit is designed to detect a voltage maximally attainable during the charging process by the device and to carry out the method if the maximally attainable voltage is less than a maximum voltage of the energy store. In this case, the maximum voltage of the energy store is the voltage required to charge the energy store completely. The maximum voltage of the energy store may have been measured by the control unit or else be stored in a storage means, such that it is able to be read out by the control unit.

BRIEF DESCRIPTION OF THE DRAWINGS

Further features and advantages of the present invention will become clear on the basis of the following description of preferred exemplary embodiments with reference to the accompanying drawings.

DETAILED DESCRIPTION OF THE INVENTION

The first step of the method S1 involves starting a charging process for an energy store in a first configuration. Step S2 involves detecting that the voltage at the electrical poles of the energy store is approaching the voltage value maximally attainable by the device used for the charging process. The current intensity emitted by the device is thereupon reduced.

Step S3 involves switching on an electrical consumer that draws the electric current emitted by the device. Step S4 then involves interrupting the charging process, for example by galvanically isolating the energy store from the device. This can be carried out for example by one or more contactors. In this state, the device supplies only the electrical consumer.

Consequently, for the device there is no difference in comparison with charging the energy store. Consequently, the method can be used even for devices which do not actually allow the charging process to be interrupted. An interaction of a user is likewise not necessary.

Step S5 involves changing the configuration of the energy store from the first configuration to a second configuration. In the second configuration, two energy store modules are connected in parallel to one another, said modules being connected in series in the first configuration. This has the consequence that the voltage required for completely charging the energy store is halved. It can thus be achieved even by a device which could not attain the voltage required for complete charging in the first configuration.

Step S6 then involves resuming the charging process. Afterward, step S7 involves switching off the electrical consumer since the latter is no longer required. In step S8, the current intensity can then be increased again in order to achieve rapid charging.

As a result of the charging of the energy store in the first configuration in step S1, more rapid charging is achieved than if the charging were carried out exclusively in the second configuration.

Figure 1:
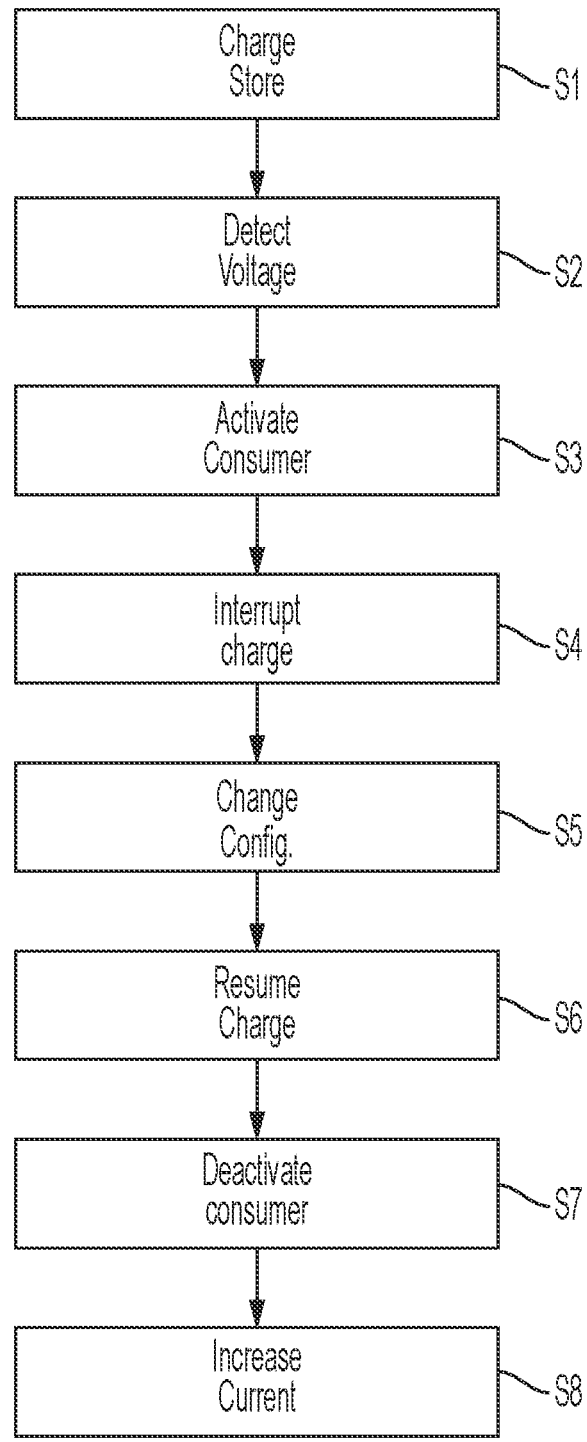
FIG. 1 shows a schematic flow diagram of a method according to one embodiment of the invention.
Figure 2:
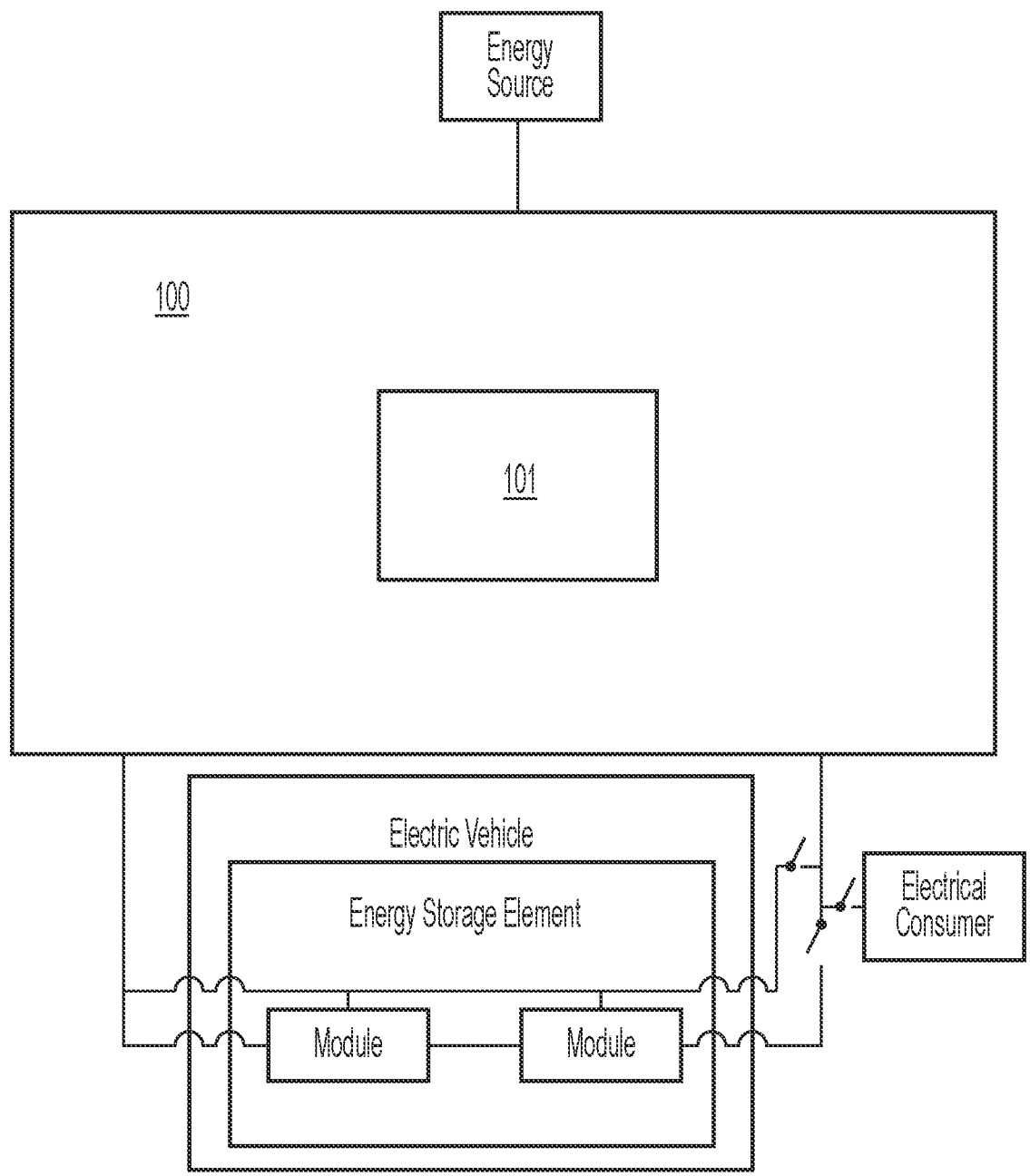
FIG. 2 shows a schematic block diagram of a device according to one embodiment of the invention.

The device 100 in FIG. 2 comprises a control unit 101. The device 100 is designed to carry out the method described with reference to FIG. 1. The control unit 101 is designed to detect a voltage maximally attainable during the charging process by the device 100 and to carry out the method if the maximally attainable voltage is less than the voltage required for completely charging the energy store in the first configuration.

What is claimed is:

1. A method for electrically charging an energy storage element, wherein the method comprises the steps of:
   starting an electrical charging process for the energy storage element, which is maintained in a first configuration (S1), by charging the energy storage element with electrical energy from an energy source;
   activating an electrical consumer (S3) prior to interrupting the charging process (S4) to the energy storage element;
   interrupting the charging process (S4) to the energy storage element;
   supplying the electrical consumer with electrical energy using the energy source during the interrupting step;
   changing the configuration of the energy storage element from the first configuration to a second configuration (S5), wherein the energy storage element in the first configuration is configured to be charged with a higher electrical voltage than in the second configuration; and
   resuming the charging process to the energy storage element in the second configuration (S6).

2. The method as claimed in claim 1, wherein the energy storage element in the second configuration has two energy storage element modules electrically connected in parallel with one another.

3. The method as claimed in claim 1, wherein the electrical consumer is switched off (S7) after resuming the charging process.

4. The method as claimed in claim 1, wherein interrupting the charging process is carried out if a voltage present between two electrical poles of the energy storage element reaches or exceeds a first voltage threshold value.

5. The method as claimed in claim 4, wherein the charging process is carried out with electric current, wherein a current intensity of the current (S2) is reduced if the voltage present between two electrical poles of the energy storage element is greater than a second voltage threshold value.

6. The method as claimed in claim 5, wherein the current intensity is increased (S8) after resuming the charging process.

7. The method as claimed in claim 5, wherein the current intensity is reduced to a value that is adapted to an electrical consumer.

8. A device for electrically charging an energy storage element, said device comprising:
a control unit configured to (i) start an electrical charging process for the energy storage element, which is maintained in a first configuration (S1), by charging the energy storage element with electrical energy from an energy source (ii) activate an electrical consumer (S3) prior to interrupting the charging process (S4) to the energy storage element; (iii) interrupt the charging process (S4) to the energy storage element, (iv) supply the electrical consumer with electrical energy using the energy source during the interrupt, (v) change the configuration of the energy storage element from the first configuration to a second configuration (S5), wherein the energy storage element in the first configuration is configured to be charged with a higher electrical voltage than in the second configuration, and (vi) resume the charging process to the energy storage element in the second configuration (S6).

9. A motor vehicle, comprising the device as claimed in claim 8.

10. The device of claim 8, wherein the control unit is further configured to (vii) deactivate the electrical consumer (S7) after resuming the charging process.

* * * * *